(12) United States Patent
Kent et al.

(10) Patent No.: US 8,839,807 B2
(45) Date of Patent: Sep. 23, 2014

(54) RAPID RESPONSE SELF-CLOSING PRESSURE EQUALIZATION VENT

(75) Inventors: Steven R. Kent, Downey, CA (US); James S. Wells, Fountain Valley, CA (US); John E. Kuhn, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1016 days.

(21) Appl. No.: 12/901,325

(22) Filed: Oct. 8, 2010

(65) Prior Publication Data

US 2012/0085426 A1 Apr. 12, 2012

(51) Int. Cl.
  *F16K 31/12* (2006.01)
  *F16K 15/02* (2006.01)
  *F16K 17/04* (2006.01)

(52) U.S. Cl.
  CPC ........... *F16K 15/023* (2013.01); *F16K 17/0493* (2013.01)
  USPC ....................................... 137/15.19; 137/535

(58) Field of Classification Search
  CPC ........................ F16K 17/0413; F16K 17/044
  USPC ............................ 137/529, 535, 15.19, 315.33
  See application file for complete search history.

(56) References Cited

U.S. PATENT DOCUMENTS

| | | | |
|---|---|---|---|
| 711,792 A | 10/1902 | Smith | |
| 2,025,240 A | * 12/1935 | Higham | ................... 417/571 |
| 2,293,956 A | 8/1942 | Walthers | |
| 3,974,850 A | 8/1976 | Pierson | |
| 4,432,514 A | 2/1984 | Brandon | |
| 5,137,231 A | 8/1992 | Boss | |
| 5,855,225 A | 1/1999 | Williams | |
| 5,871,178 A | 2/1999 | Barnett et al. | |
| 6,264,141 B1 | 7/2001 | Shim et al. | |

FOREIGN PATENT DOCUMENTS

GB   2072116 A   9/1981

* cited by examiner

*Primary Examiner* — Kevin Lee
*Assistant Examiner* — P. Macade Nichols
(74) *Attorney, Agent, or Firm* — Felix L. Fischer

(57) ABSTRACT

A rapid response self-closing pressure equalization vent employs a frame supported in a compartment divider and a movable vent portion having a periphery sealingly engaging the frame in a closed position. Multiple resilient extension elements are attached to the frame and engage the movable vent portion for even displacement around a periphery of the movable vent portion relative to the frame to an open position responsive to a pressure differential on the movable vent portion. The resilient extension elements retract upon equalization of the pressure differential to reseat the movable vent portion in the frame.

19 Claims, 7 Drawing Sheets

# RAPID RESPONSE SELF-CLOSING PRESSURE EQUALIZATION VENT

STATEMENT REGARDING FEDERALLY SPONSORED RESEARCH OR DEVELOPMENT

The invention was made with Government support under Contract Number DTFACT-03-C-00046 awarded by the Department of Homeland Security. The Government has certain rights in this invention.

BACKGROUND INFORMATION

1. Field

Embodiments of the disclosure relate generally to depressurization safety devices for aircraft and more particularly to embodiments for a large-capacity, rapid response, passively acting, cargo compartment vent employing multiple, constant-force springs for control of translational opening of a vent element.

2. Background

Large commercial aircraft internal fuselage structure typically must be equipped with venting capability between the cargo compartment and passenger compartment to accommodate rapid pressure equalization requirements due to decompression or other pressure imbalance. Current practice in the industry provides different vent designs which are installed to perform different pressure equalization tasks. To achieve required flow requirements, multiple vents are typically employed resulting in higher weight and manufacturing costs. Alternatively, current pressure equalization devices employ a side hinge arrangement for greater area displacement applications. However, full venting orifice dimensions are only achieved after an opening time delay. Fire suppression safety requirements additionally mandate a self-closing vent for resealing after pressure equalization has been achieved with respect to certain (but not all) compartments Improvements in response, flow capability and sealing over existing vent designs are therefore needed.

It is therefore desirable to provide a vent element with a translational opening motion, rather than a rotational motion about a hinge line while maintaining high flow capability and self resealing.

SUMMARY

Embodiments disclosed herein provide a rapid response self-closing pressure equalization vent employing a frame supported in a compartment divider and a movable vent portion having a periphery sealingly engaging the frame in a closed position. Multiple resilient extension elements are attached to the frame and engage the movable vent portion for even displacement around a periphery of the movable vent portion relative to the frame to an open position responsive to a pressure differential on the movable vent portion. The resilient extension elements retract upon equalization of the pressure differential to reseat the movable vent portion in the frame.

In one exemplary embodiment a rapid response self-closing pressure equalization system for aircraft compartments incorporates a vent assembly mounted in a compartment divider. The vent assembly includes a frame having a formed receiver supported in the compartment divider and a movable vent portion with a rectangular door having a periphery with a bulb seal to sealingly engage the formed receiver in a closed position. Four yokes are centered on edges of the door and eight constant force springs have coils supported on the yokes and are attached to brackets depending from the frame for even displacement around a periphery of the door relative to the frame to an open position responsive to a pressure differential on the movable vent portion. The constant force springs retract upon equalization of the pressure differential to reseat the movable vent portion in the frame in the closed position. Symmetrical extension limiting lanyards interconnect the yokes and the frame and corner guides depend from the frame to engage corners of the door for alignment during transition between the open and closed position.

A method for fabricating and operating the embodiments disclosed includes fabricating a movable vent to be carried in a frame. The movable vent is suspended from the frame by multiple resilient extension elements spaced about the periphery of the movable vent. The movable vent is then displaced from the frame responsive to a pressure differential acting on a door face of the movable vent, extending the resilient extension elements. This exposes a vent area around substantially the entire periphery of the movable vent. Upon equalization of the pressure, the resilient extension elements retract drawing the movable vent back into sealing engagement with the frame.

The features, functions, and advantages that have been discussed can be achieved independently in various embodiments of the present disclosure or may be combined in yet other embodiments further details of which can be seen with reference to the following description and drawings.

DETAILED DESCRIPTION

The embodiments described herein demonstrate a venting system with an outer frame to attach the mechanism to a wall or floor carrying a movable inner vent portion which is normally sealed to the outer frame. Multiple springs acting on the periphery of the vent portion keep the vent closed prior to responding to the activation pressure and return the movable portion to its sealed position when pressure equalizes. Limit straps limit the opening motion of the vent at a specified point and, in combination with corner guides, center the movable portion for subsequent closing motion and resealing to the outer frame. The full venting orifice dimensions are achieved more quickly than with side-hinged designs with the multiple springs allowing all four sides of the movable vent portion to open simultaneously. Air is vented evenly rather than directed to the side opposite a vent hinge line. The clearance envelope required behind the device is shallower than with side-hinged designs to achieve the same venting area. Additionally, pressure pulse reaction forces are more evenly distributed symmetrically around the circumference of the venting orifice thereby reducing the total device weight by avoiding any requirement for structural strength to offset asymmetric thrust. Load symmetry lends itself to a lower-cost, modular, built-up design using standard extruded shapes, rather than requiring a machined part. A single design can accommodate a wide range of activation pressures by using different sets of springs with selected spring constants for determining restoring force.

Figure 4:
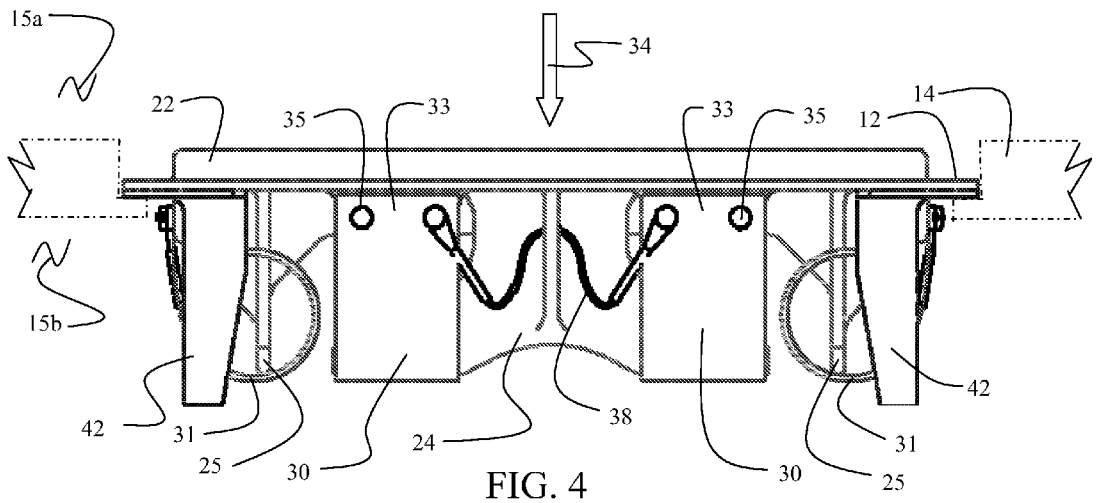
FIG. 4 is a side view of the embodiment of the vent assembly in the closed condition.
Figure 5:
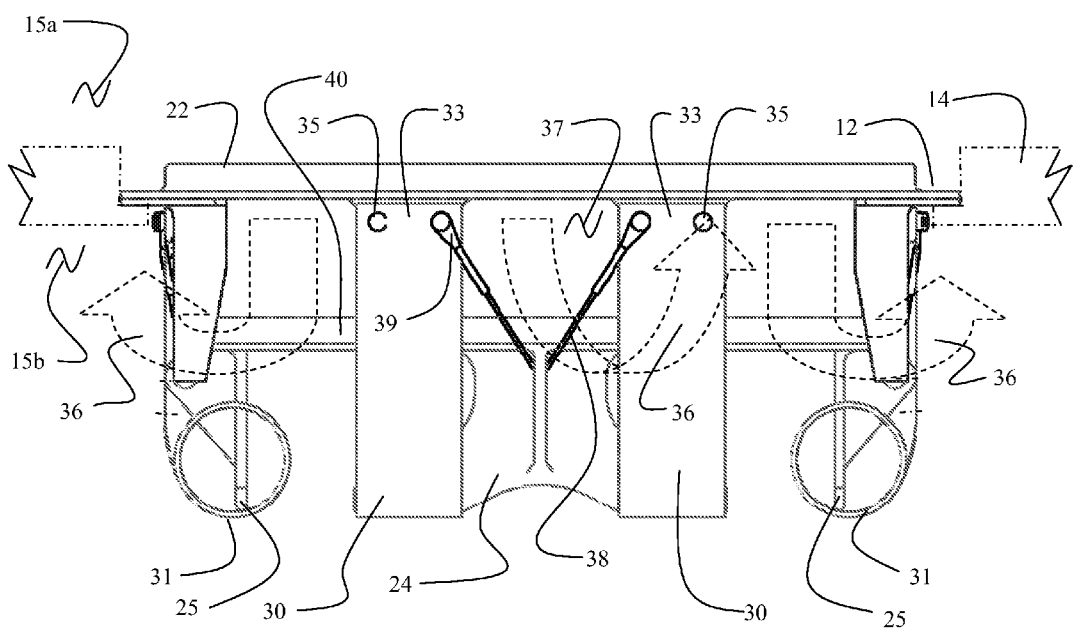
FIG. 5 is a side view of the embodiment of the vent assembly in the activated or open condition.

Referring to the drawings, an exemplary embodiment of a rapid response self-closing pressure equalization vent 10 is shown. A frame 12 is employed to secure the pressure equalization vent 10 to a divider such as a wall or floor structure 14 (shown in phantom in FIGS. 4 and 5) dividing the compartments, generally designated 15a and 15b, for which pressure equalization is required. For the embodiments shown, an aircraft floor 14 between a passenger compartment and a cargo compartment would be an example of anticipated use. FIGS. 4 and 5 represent the frame as supported in a cutout of the floor however in alternative embodiments, the frame may be lapped between layers of floor structure or otherwise integrated into the floor or other divider. A moveable vent portion 16 (best seen in FIGS. 2, 5, 6 and 7) includes a door 18 having an outer surface 20 which may be substantially flush with the floor surface. For the embodiment shown, a formed receiver 22 (best seen in FIGS. 4 and 5) is incorporated in the frame to sealingly engage the door in the closed position as will be described in greater detail subsequently.

Figure 1:
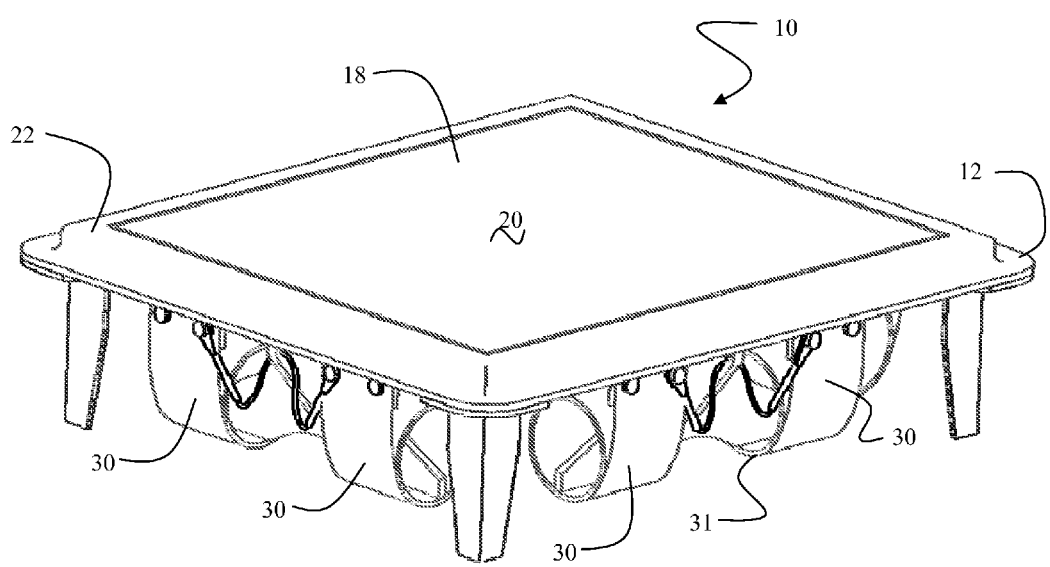
FIG. 1 is a top isometric view of an exemplary embodiment of a vent assembly in the closed condition.
Figure 2:
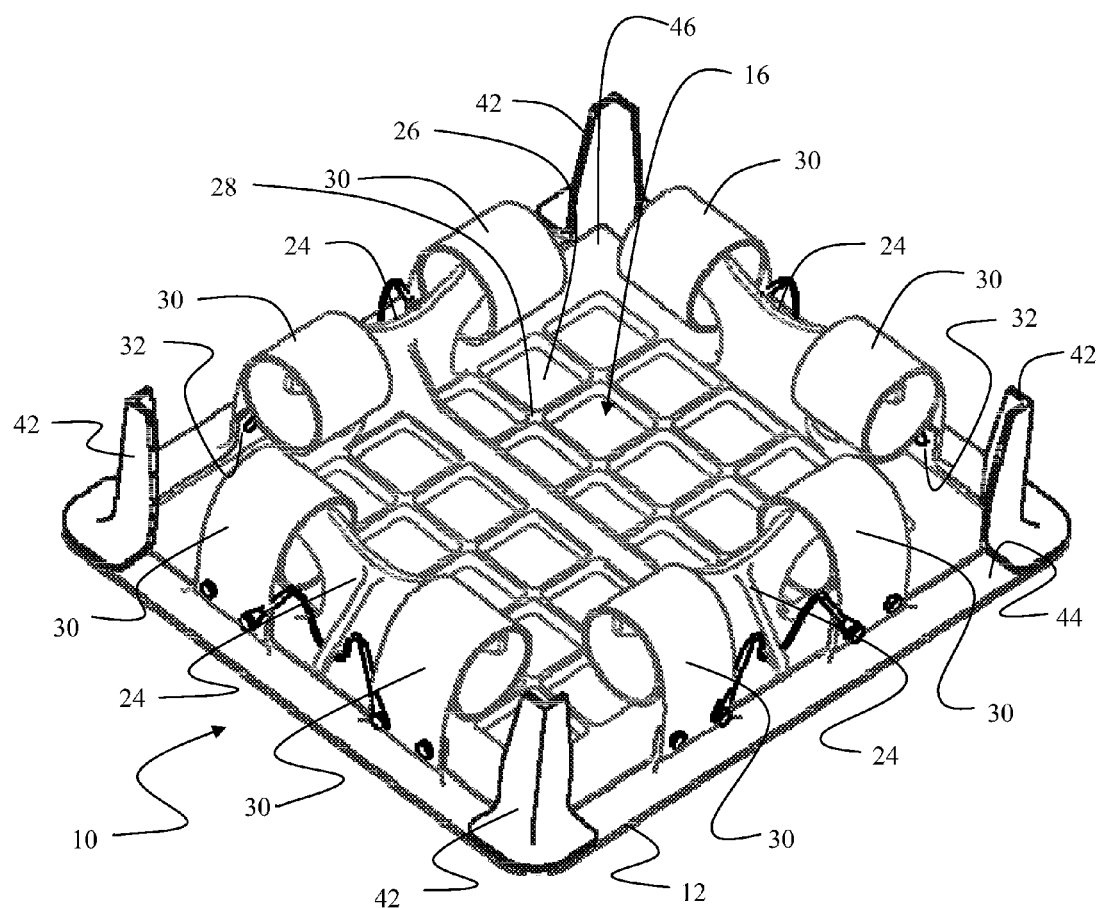
FIG. 2 is a bottom isometric view of the embodiment of the vent assembly in the closed condition.
Figure 3:
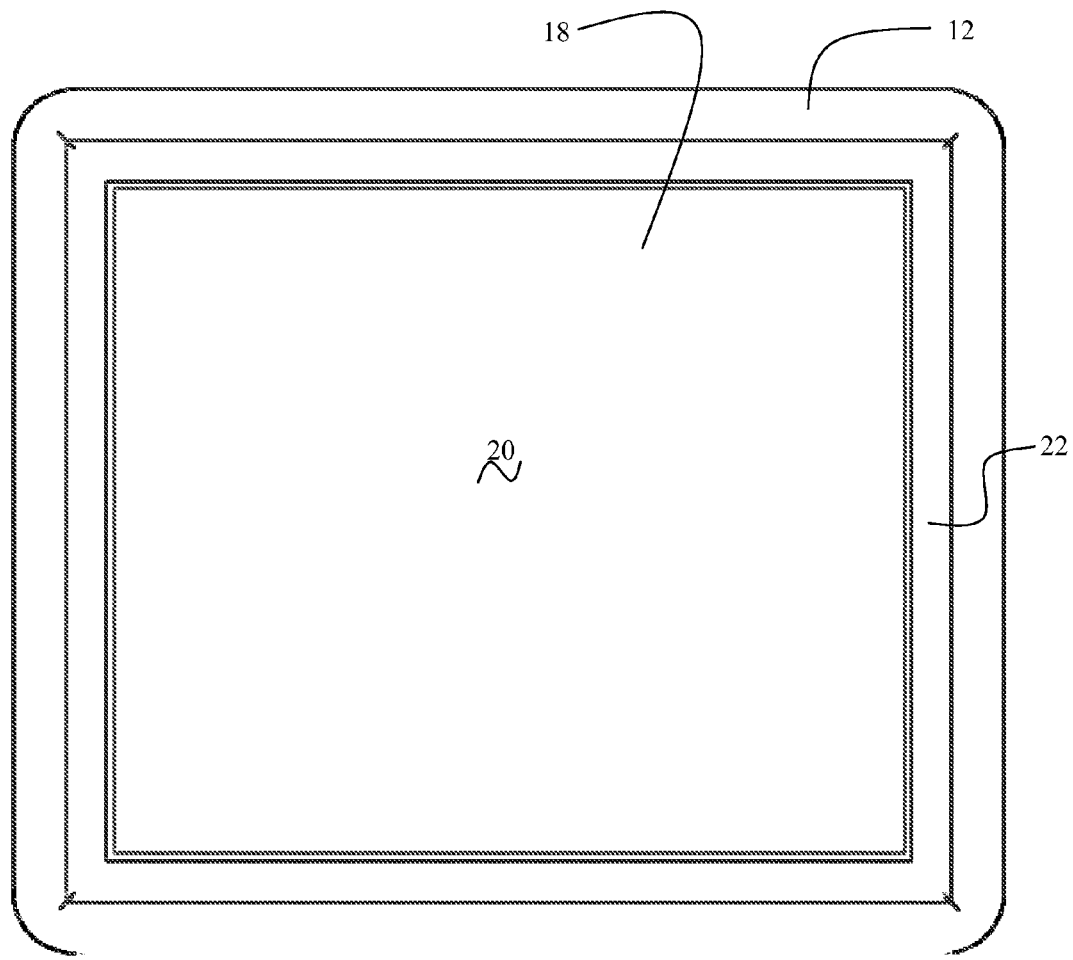
FIG. 3 is a top view of the embodiment of the vent assembly in the closed condition.

Movable vent portion 16 includes support yokes 24 which extend from an inner surface 26 of the door 18. As shown in FIG. 2 for the exemplary embodiment, the inner surface may employ ribs 28 or other structural stiffeners to increase rigidity. Yokes 24 support resilient extension elements 30 which are substantially evenly spaced about the perimeter of the moveable vent portion and attached to the frame with brackets 32. For the embodiment shown, constant force springs are employed as the resilient extension elements. Constant force springs are a special variety of extension spring. They are tightly coiled wound bands of pre-hardened spring steel or stainless steel strip with built-in curvature so that each turn of the strip wraps tightly on its inner neighbor. When the strip is extended (deflected), the inherent stress resists the loading force; the same as a common extension spring, but at a nearly constant rate. The constant-force spring is well suited to long extensions with no load build-up. In use, the spring is usually mounted with the inside diameter (ID) tightly wrapped on a drum and the free end attached to the loading force. Considerable flexibility is possible with constant-force springs because the load capacity can be multiplied by using two or more strips in tandem, or back-to-back. Constant force springs are available in a wide variety of sizes. As best seen in FIGS. 4 and 5 for the exemplary embodiment, coils 31 of the constant force springs are supported by arms 25 extending from the yokes 24 for free rotation of the coils during extension of the springs. For the embodiment shown, attachment of ends 33 of the springs to the brackets 32 is accomplished with rivets 35 or other suitable fasteners.

Figure 6:
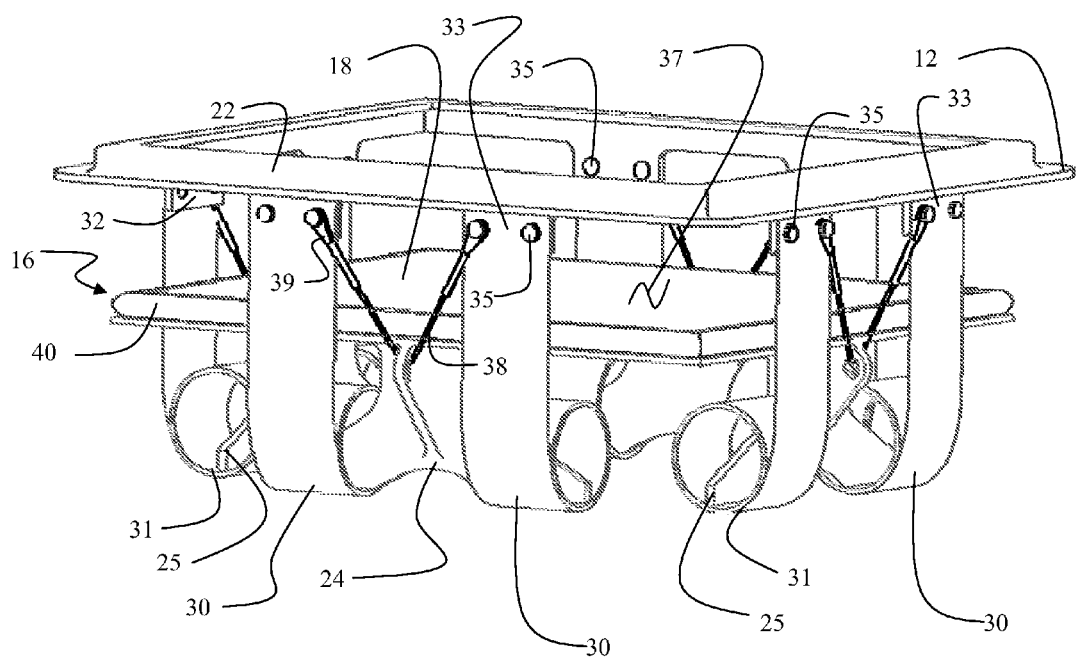
FIG. 6 is a top isometric view of the exemplary embodiment of the vent assembly in the open condition.
Figure 7:
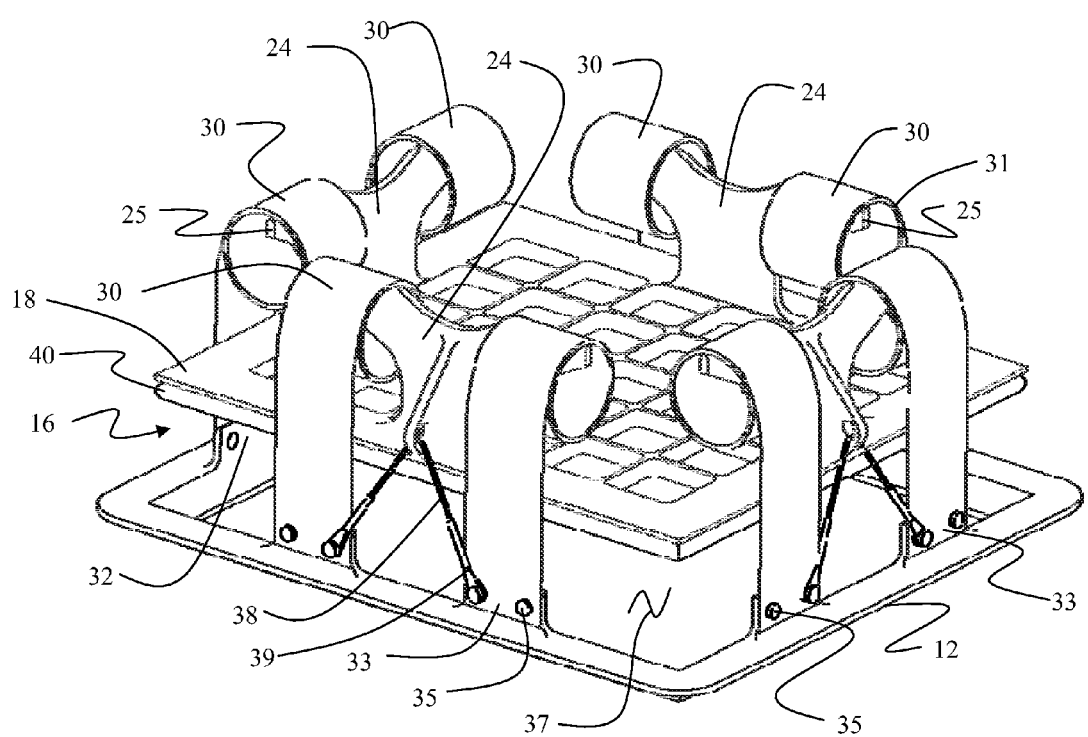
FIG. 7 is a bottom isometric view of the embodiment of the vent assembly in the open condition; and, FIG. 8 is a flow chart of a method of implementing the embodiments shown for venting operation.

As shown in FIGS. 4 and 5, when a pressure differential (represented by arrow 34) is exerted on surface 20 of door 18, the door is displaced from the formed receiver 22 with specific resistance provided by the resilient extension elements. Use of constant force springs provides a predictable and consistent displacement around all four edges of the periphery of the door in response to the differential pressure to allow venting for equalization of pressure as represented by arrows 36 in FIG. 5. For the embodiment shown a rectangular planform for the door 18 is shown. For the embodiment in the drawings, the symmetrical yokes 24 are centered in the edges of the door on the movable vent portion each supporting two constant force springs. For a square or rectangular vent as shown eight springs are employed. In alternative embodiments, various geometries having symmetrically supportable peripheries may be employed. The vent area, generally depicted as element 37 extends substantially around the entire periphery of the door of the movable vent portion providing the maximum venting area exposure in the least amount of time with the smallest total travel by the movable vent portion. Limiting lanyards 38 associated with each yoke define the maximum extent of the displacement of the movable vent portion. For the embodiment shown, the lanyards are flexible cables terminating in headers 39 which may be attached to the structure of the frame at brackets 32 in conjunction with the spring ends using rivets 35 Upon equalization of the pressure between compartments on opposite sides of the wall 14, the resilient extension elements draw the movable vent portion back into contact with the formed receiver 22. As best seen in FIGS. 5, 6 and 7, a bulb seal 40 around the periphery of the door is received within and sealingly engages the formed receiver.

To assist in maintaining alignment of the movable vent portion during displacement for pressure equalization and return to sealing engagement with the formed receiver, corner guides 42 (best seen in FIGS. 2, 4 and 5) depending from a lower surface 44 of frame 12 engage corners 46 of the movable vent portion. FIGS. 6 and 7 are shown without the corner guides to more clearly show details of the movable vent portion corners and bulb seal. Symmetrical placement of the lanyards on the yokes assists in maintaining alignment of the movable vent portion with the frame.

Figure 8:
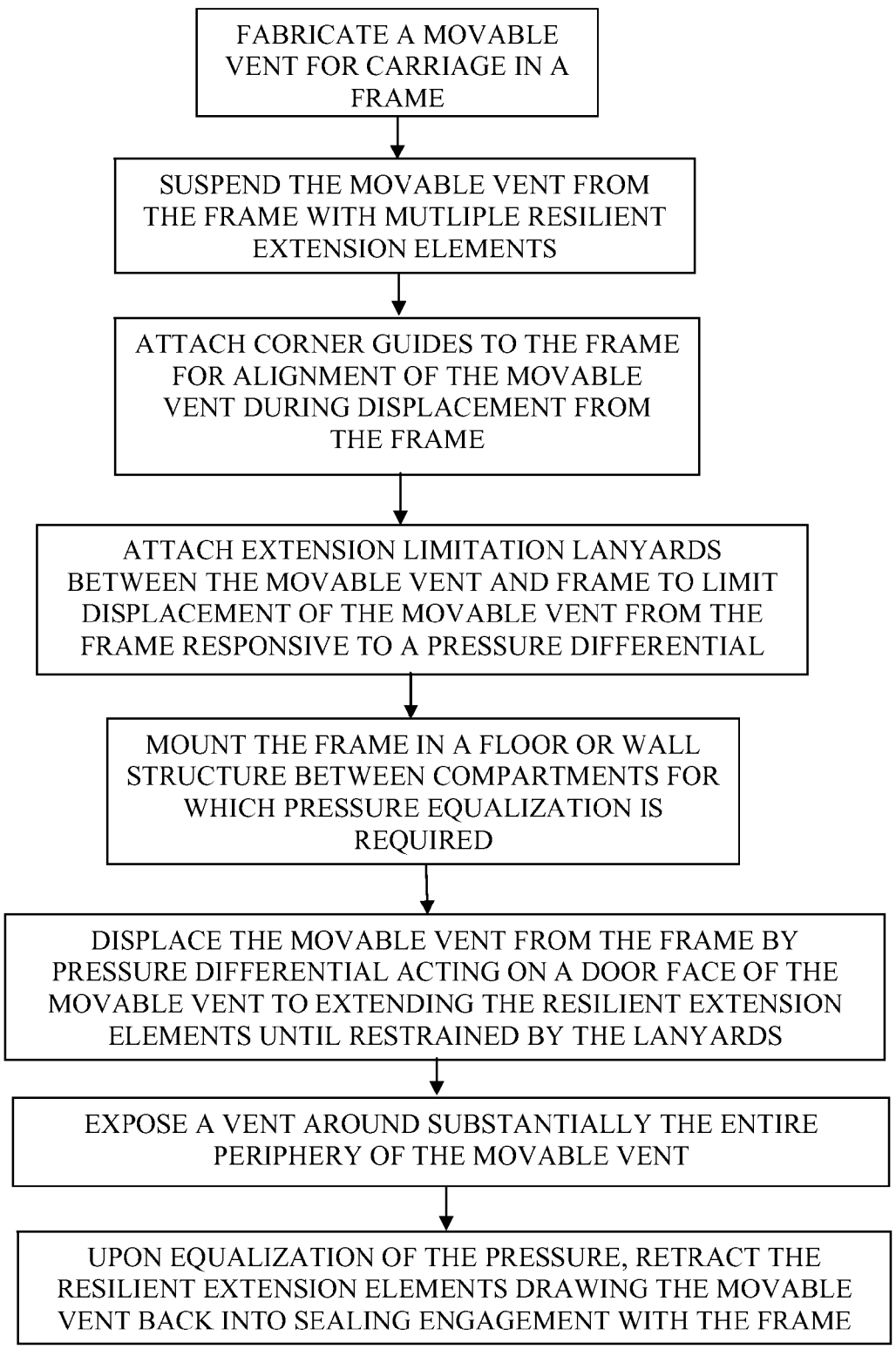

The embodiments shown may be implemented and operated using the method described in FIG. 8. A movable vent is fabricated to be carried in a frame, step 802. The movable vent is suspended from the frame by multiple resilient extension elements such as constant force springs which are spaced about the periphery of the movable vent, step 804, and corner guides are attached to the frame for alignment of the movable vent during displacement from the frame, step 806. Extension limitation lanyards are attached between the movable vent and frame to limit displacement of the movable vent from the frame responsive to a pressure differential, step 808. The frame is mounted in a floor or wall structure between compartments for which pressure equalization is required, step 810. Pressure differential acting on a door face of the movable vent displaces the movable vent from the frame, extending the resilient extension elements until restrained by the lanyards, step 812, which exposes a vent around substantially the entire periphery of the movable vent, step 814. Upon equalization of the pressure, the resilient extension elements retract drawing the movable vent back into sealing engagement with the frame, step 816. For the embodiment shown this is accomplished by drawing the bulb seal into the formed receiver in the frame.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A rapid response self-closing pressure equalization vent comprising:
 a frame supported in a compartment divider;
 a movable vent portion having a periphery sealingly engaging the frame in a closed position;

a plurality of resilient extension elements attached to the frame and engaging the movable vent portion for even displacement around a periphery of the movable vent portion relative to the frame to an open position responsive to a pressure differential on the movable vent portion, said resilient extension elements retracting upon equalization of the pressure differential to reseat the movable vent portion in the frame in the closed position, and, extension limiting lanyards connected between the vent portion and the frame.

2. The rapid response self-closing pressure equalization vent as defined in claim 1 wherein the movable vent portion includes a plurality of yokes extending from an inner surface to support the resilient extension elements.

3. The rapid response self-closing pressure equalization vent as defined in claim 2 wherein the resilient extension elements are attached to brackets depending from the frame.

4. The rapid response self-closing pressure equalization vent as defined in claim 2 wherein the resilient extension elements are constant force springs having coils supported on the yokes.

5. The rapid response self-closing pressure equalization vent as defined in claim 4 wherein the movable vent portion includes a rectangular door and each yoke is centered on an edge of the door, each yoke supporting two constant force springs.

6. The rapid response self-closing pressure equalization vent as defined in claim 2 wherein the extension limiting lanyards are connected between the yokes and the frame.

7. The rapid response self-closing pressure equalization vent as defined in claim 1 wherein the frame includes a formed receiver and the movable vent portion includes a door received in the formed receiver.

8. The rapid response self-closing pressure equalization vent as defined in claim 7 further comprising a bulb seal surrounding a periphery of the door to engage the formed receiver for a seal in the closed position.

9. The rapid response self-closing pressure equalization vent as defined in claim 7 further comprising corner guides depending from the frame to engage corners of the door for alignment during transition between the open and closed position.

10. The rapid response self-closing pressure equalization vent as defined in claim 1 wherein the movable vent portion includes a plurality of yokes extending from an inner surface to support the resilient extension elements and wherein the resilient extension elements are constant force springs attached to brackets depending from the frame and having coils supported on the yokes.

11. The rapid response self-closing pressure equalization vent as defined in claim 10 wherein the movable vent portion includes a rectangular door and each yoke is centered on an edge of the door, each yoke supporting two constant force springs and having an extension limiting lanyard connected between the yoke and the frame.

12. The rapid response self-closing pressure equalization vent as defined in claim 11 wherein the frame includes a formed receiver and the movable vent portion includes a door received in the formed receiver with a bulb seal surrounding a periphery of the door to engage the formed receiver for a seal in the closed position.

13. The rapid response self-closing pressure equalization vent as defined in claim 12 further comprising corner guides depending from the frame to engage corners of the door for alignment during transition between the open and closed position.

14. The rapid response self-closing pressure equalization vent as defined in claim 1 wherein the movable vent portion includes a rectangular door received in a formed receiver in the frame with a bulb seal surrounding a periphery of the door to engage the formed receiver for a seal in the closed position, each yoke being centered on an edge of the door and supporting two constant force springs with an extension limiting lanyard connected between the yoke and the frame; and wherein corner guides depend from the frame to engage corners of the door for alignment during transition between the open and closed position.

15. A rapid response self-closing pressure equalization system for aircraft compartments comprising:

a vent assembly mounted in a compartment divider, said vent assembly having a frame supported in the compartment divider having a formed receiver;

a movable vent portion with a rectangular door having a periphery with a bulb seal to sealingly engage the formed receiver with in a closed position;

four yokes centered on edges of the door;

eight constant force springs having coils supported on the yokes and attached to brackets depending from the frame for even displacement around a periphery of the door relative to the frame to an open position responsive to a pressure differential on the movable vent portion, said constant force springs retracting upon equalization of the pressure differential to reseat the movable vent portion in the frame in the closed position;

symmetrical extension limiting lanyards interconnecting the yokes and the frame; and, corner guides depending from the frame to engage corners of the door for alignment during transition between the open and closed position.

16. A method for fabrication and operation of a differential pressure vent comprising:

fabricating a movable vent to be carried in a frame;

suspending the movable vent from the frame by multiple resilient extension elements spaced about the periphery of the movable vent;

attaching extension limitation lanyards between the movable vent and frame;

mounting the frame in a divider between compartments for which pressure equalization is required;

displacing the movable vent from the frame, extending the resilient extension elements responsive to a pressure differential acting on a door face of the movable vent, said extension limitation lanyards limiting displacement of the movable vent from the frame during extension of the resilient extension elements;

exposing a vent around substantially the entire periphery of the movable vent; and, upon equalization of the pressure, retracting the resilient extension elements drawing the movable vent back into sealing engagement with the frame.

17. The method of claim 16 in which the resilient extension elements are constant force springs.

18. The method of claim 16 further comprising:

attaching corner guides to the frame for alignment of the movable vent during displacement from the frame.

19. The method of claim 16 further wherein fabricating a movable vent to be carried in a frame includes forming a receiver in the frame and incorporating a door in the movable vent and further comprising:

surrounding a periphery of the door with a bulb seal for sealing engagement with the formed receiver.

\* \* \* \* \*